United States Patent
Previdi et al.

(10) Patent No.: US 8,374,092 B2
(45) Date of Patent: Feb. 12, 2013

(54) TECHNIQUE FOR PROTECTING AGAINST FAILURE OF A NETWORK ELEMENT USING MULTI-TOPOLOGY REPAIR ROUTING (MTRR)

(75) Inventors: Stefano B. Previdi, Rome (IT); David D. Ward, Los Gatos, CA (US); Jean-Philippe Vasseur, Dunstable, MA (US); Ian Michael Charles Shand, Cobham (GB); Stewart Bryant, Merstham (GB)

(73) Assignee: Cisco Technology, Inc., San Jose, CA (US)

( * ) Notice: Subject to any disclaimer, the term of this patent is extended or adjusted under 35 U.S.C. 154(b) by 668 days.

(21) Appl. No.: 11/511,128

(22) Filed: Aug. 28, 2006

(65) Prior Publication Data

US 2008/0049622 A1    Feb. 28, 2008

(51) Int. Cl.
G01R 31/08    (2006.01)
(52) U.S. Cl. ...................................................... 370/237
(58) Field of Classification Search .................. 370/216, 370/217, 218, 225, 229, 237, 221
See application file for complete search history.

(56) References Cited

U.S. PATENT DOCUMENTS

| | | | |
|---|---|---|---|
| 6,584,093 B1 | 6/2003 | Salama et al. | |
| 6,725,401 B1 * | 4/2004 | Lindhorst-Ko | 714/47 |
| 6,778,492 B2 | 8/2004 | Charny et al. | |
| 6,895,441 B1 * | 5/2005 | Shabtay et al. | 709/238 |
| 6,957,071 B1 | 10/2005 | Holur et al. | |
| 6,990,086 B1 | 1/2006 | Holur et al. | |
| 6,996,065 B2 * | 2/2006 | Kodialam et al. | 370/238 |
| 7,042,838 B1 | 5/2006 | Shand et al. | |
| 7,054,262 B2 | 5/2006 | Gerstel | |
| 7,362,709 B1 * | 4/2008 | Hui et al. | 370/237 |
| 7,406,032 B2 * | 7/2008 | Li et al. | 370/217 |
| 7,500,013 B2 * | 3/2009 | Dziong et al. | 709/238 |
| 2003/0126287 A1 | 7/2003 | Charny et al. | |
| 2003/0233595 A1 | 12/2003 | Charny et al. | |
| 2004/0052207 A1 | 3/2004 | Charny et al. | |
| 2004/0156310 A1 * | 8/2004 | Fredette et al. | 370/216 |
| 2005/0083928 A1 | 4/2005 | Sivabalan et al. | |
| 2005/0097219 A1 | 5/2005 | Goguen et al. | |
| 2007/0263554 A1 * | 11/2007 | Finn | 370/256 |
| 2009/0028141 A1 * | 1/2009 | Vu Duong et al. | 370/389 |

OTHER PUBLICATIONS

Rekhter, Y., et al., "A Border Gateway Protocol 4 (BGP-4)", Network Working Group Request for Comments: 1771, pp. 1-54, Mar. 1995.
Moy, J., "OSPF Version 2", Network Working Group Request for Comments: 2328, pp. 1-204, Apr. 1998.

(Continued)

*Primary Examiner* — Kwang B Yao
*Assistant Examiner* — Anh Ngoc Nguyen
(74) *Attorney, Agent, or Firm* — Cesari and McKenna, LLP

(57) ABSTRACT

A technique protects against failure of a network element using Multi-Topology Repair Routing (MTRR) in a computer network. According to the novel technique, a protecting node (e.g., a router) maintains Multi-Topology Routing (MTR) databases for a first topology and at least a second topology. The protecting node determines whether any acceptable repair paths are available in the first topology for a protected network element (e.g., node, link, etc.) of the first topology. If not, the protecting node may establish a repair path (e.g., for Fast ReRoute, FRR) in the second topology for the protected network element.

28 Claims, 8 Drawing Sheets

OTHER PUBLICATIONS

Callon, R., "Use of OSI IS-IS for Routing in TCP/IP and Dual Environments", Network Working Group Request for Comments: 1195, pp. 1-80, Dec. 1990.

Perlman, R., Interconnections Second Edition: Bridges, Routers, Switches, and Internetworking Protocols, Section 12.2.4, Addison Wesley Longman, Inc., pp. 317-319, 2000.

Przygienda, T., et al., "M-ISIS: Multi Topology (MT) Routing in IS-IS", Network Working Group Internet Draft (draft-ietf-isis-wg-multi-topology-11.txt), pp. 1-12, Apr. 2006.

Previdi, S., et al., "IS-IS Multi-Instance Multi-Topology", Network Working Group Internet Draft (draft-previdi-isis-mi-mt-01.txt), pp. 1-8, Jun. 2006.

Psenak, P., et al., "Multi-Topology (MT) Routing in OSPF", Network Working Group Internet Draft (draft-ietf-ospf-mt-06.txt), pp. 1-22, Feb. 2006.

Shand, M., et al., "IP Fast Reroute Framework", Network Working Group Internet Draft (draft-ietf-rtgwg-ipfrr-framework-05.txt), pp. 1-14, Mar. 2006.

Atlas, A., et al., "Basic Specification for IP Fast-Reroute: Loop-Free Alternates", Network Working Group Internet Draft (draft-ietf-rtgwg-ipfrr-spec-base-05.txt), pp. 1-25, Feb. 2006.

Pan, P., et al., "Fast Reroute Extensions to RSVP-TE for LSP Tunnels", Network Working Group Request for Comments: 4090, pp. 1-36, May 2005.

* cited by examiner

TECHNIQUE FOR PROTECTING AGAINST FAILURE OF A NETWORK ELEMENT USING MULTI-TOPOLOGY REPAIR ROUTING (MTRR)

BACKGROUND OF THE INVENTION

1. Field of the Invention

The present invention relates to computer networks and, more particularly, to protecting against failure of a network element using Multi-Topology Repair Routing (MTRR) in a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain," and a router that interconnects different domains is generally referred to as a "border router."

An example of an inter-domain routing protocol is the Border Gateway Protocol version 4 (BGP), which performs routing between domains (ASes) by exchanging routing and reachability information among neighboring inter-domain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol* 4 (BGP-4), published March 1995.

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version* 2, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol (e.g., IS-IS, or OSPF). Conventional link-state protocols use link-state advertisements or link-state packets (or "IGP Advertisements") for exchanging routing information between interconnected intermediate network nodes (IGP nodes). As used herein, an IGP Advertisement generally describes any message used by an IGP routing protocol for communicating routing information among interconnected IGP nodes, i.e., routers and switches. Operationally, a first IGP node may generate an IGP Advertisement and "flood" (i.e., transmit) the packet over each of its network interfaces coupled to other IGP nodes. Thereafter, a second IGP node may receive the flooded IGP Advertisement and update its routing table based on routing information contained in the received IGP Advertisement. Next, the second IGP node may flood the received IGP Advertisement over each of its network interfaces, except for the interface at which the IGP Advertisement was received. This flooding process may be repeated until each interconnected IGP node has received the IGP Advertisement and updated its local routing table.

In practice, each IGP node typically generates and disseminates an IGP Advertisement whose routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

As noted, IGP Advertisements are usually flooded until each intermediate network IGP node has received an IGP Advertisement from each of the other interconnected intermediate nodes, which may be stored in a link state database (LSDB). Then, each of the IGP nodes (e.g., in a link-state protocol) can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such a SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation (notably, creating a "shortest path tree" or SPT, as will be understood by those skilled in the art).

In some computer networks, multiple independent network topologies may be supported over one physical network topology. This type of "multi-topology routing" (MTR) may be used (e.g., by link-state protocols) to influence the path certain types of traffic (e.g., voice, video, data, etc.) take over the network to reach their respective destinations. In this manner, traffic separation may be achieved across the network, such that certain links are available to certain types of traffic, while other links are available to other types of traffic. In particular, MTR may be used to prevent certain links from being used for certain types of traffic as well, such as, e.g., preventing video/voice traffic (requiring high QoS) from traversing low QoS links of the network. Each router of an MTR network computes a distinct SPT for each topology, and is aware of only those topologies to which the router belongs/ participates. Conventionally, routers may either store/manage all topologies in a single instance (single RIB/LSDB), or may instead store/manage each topology in a separate instance corresponding to each MTR topology (multiple RIBs/LSDBs). MTR for link-state protocols (IS-IS and OSPF) is described further in the Internet Draft by Przygienda et al., entitled *M-ISIS: Multi-Topology (MT) Routing in IS-IS<draft-ietf-isis-wg-multi-topology-11.txt>*, dated October 2005, the Internet Draft by Previdi et al., entitled *IS-IS Multi-instance Multi-topology <draft-previdi-isis-mi-mt-01.txt>*, dated June 2006, and the Internet Draft by Psenak et al., entitled *Multi-Topology (MT) Routing in OSPF <draft-ietf-ospf-mt-06.txt>*, dated Feb. 1, 2006, the contents of all of which are hereby incorporated by reference as though fully set forth herein.

Occasionally, a network element (e.g., a node or link) will fail, causing redirection of the traffic that originally traversed the failed network element to other network elements that bypass the failure. Generally, notice of this failure is relayed to the nodes in the network through an advertisement of the new network topology, e.g., an IGP or BGP Advertisement, and routing tables are updated to avoid the failure accordingly. Reconfiguring a network in response to a network element failure using, e.g., pure IP rerouting, can be time consuming. Many recovery techniques, however, are available to provide fast recovery and/or network configuration in the event of a network element failure, including, inter alia, "Fast Reroute", e.g., IP Fast Reroute (IP FRR) and tunneling FRR (e.g., MPLS TE FRR). An example of IP FRR is described in Shand, et al., *IP Fast Reroute Framework <draft-ietf-rtgwg-ipfrr-framework-05.txt>*, Internet Draft, March 2006, and in Atlas, et al., *Basic Specification for IP Fast-Reroute: Loop-free Alternates <draft-ietf-rtgwg-ipfrr-spec-base-05>*, Internet Draft, February 2006, the contents of both of which are hereby incorporated by reference as though fully set forth herein. An example of MPLS TE FRR is described in RFC 4090, entitled *Fast Reroute Extensions to RSVP-TE for LSP Tunnels*, dated May 2005, which is hereby incorporated by reference as though fully set forth herein.

IP FRR has been developed to protect against network element failures, where a protecting network node determines "Loop Free Alternates" (LFAs) of protected network elements to reach a particular destination. Specifically, a conventional LFA may generally be defined as an alternate next-hop node (i.e., not a current/selected next-hop node) or an alternate to other protected network elements (e.g., links) to the particular destination that does not loop back (return) to the protecting network device or the protected element (e.g., nodes/links) to reach that destination. For example, if a neighboring network device has selected the protecting network device as a next-hop to reach the destination sending traffic from the protecting network device to that neighboring network device (e.g., in the event of a network element failure) would result in a loop between the two devices (e.g., until the network re-converges to remove the failed network element). By employing an LFA when the protected network element fails, however, traffic may be diverted to the LFA in order to reach the destination without utilizing the failed network element, and without creating any loops.

In a tunneling FRR, "backup tunnels" are created to bypass a protected network element (e.g., links, shared risk link groups (SRLGs), and nodes). When the network element fails, traffic is quickly rerouted over a backup tunnel to bypass the failed element, or more particularly, in the case of MPLS, a set of TE-LSP(s) is quickly rerouted. Specifically, a protecting network node (e.g., the "point of local repair," PLR) configured to reroute the traffic inserts ("pushes") a new label for the backup tunnel, and the traffic is rerouted accordingly. Once the failed element is bypassed, the backup tunnel label is removed ("popped"), and the traffic is routed along the original path according to the next label (e.g., that of the original TE-LSP), or according to IP routing (if no original tunnel exists).

For both IP FRR and tunneling FRR, the LFAs or backup tunnels may generally be referred to as "repair paths," in that they are used to repair a failed path (i.e., the original/protected path). When the repair paths are computed, the protecting network node inspects its routing database (e.g., its LSDB) to determine a repair path. In particular, when a single network topology is used, the LSDB used for the original/protected path (e.g., based on an SPT) is the same LSDB used for the repair path computation (i.e., it's the only LSDB/topology). When MTR is used, the protecting node conventionally protects a network element by inspecting the LSDB of the topology of the protected element, and determines an appropriate repair path within that topology (i.e., there is no MTR topology cross-over). (Notably, if the protected element belongs to more than one topology, a repair strategy, e.g., manually configured, may be used to determine the appropriate topology.) However, in the event the topology of the protected network element does not have an acceptable repair path, there is currently no known means available for a protecting node to utilize a different topology. For instance, a different topology may offer a path around the protected element, yet due to the underlying principle of MTR, the distinct topologies remain separate and unusable, even temporarily and acceptably (allowably), by other topologies. There remains a need, therefore, for a technique that allows a protecting node to utilize MTR topologies efficiently for repair paths (e.g., FRR), without compromising the integrity of MTR (i.e., substantially maintaining separate topologies).

SUMMARY OF THE INVENTION

The present invention is directed to a technique for protecting against failure of a network element using Multi-Topology Repair Routing (MTRR) in a computer network. According to the novel technique, a protecting node (e.g., a router) maintains Multi-Topology Routing (MTR) databases for a first topology and at least a second topology. The protecting node determines whether any acceptable repair paths are available in the first topology for a protected network element (e.g., node, link, etc.) of the first topology. If not, the protecting node may establish a repair path (e.g., for Fast ReRoute, FRR) in the second topology for the protected network element.

In accordance with one aspect of the present invention, the protecting node may be configured either to use at least one statically configured topology, or to dynamically discover at least one alternative topology suitable for repair paths. Accordingly, nodes within the network may dynamically advertise the status (e.g., per-topology) of the network links, the nodes themselves, etc., illustratively, for example, utilizing extensions to Interior Gateway Protocol (IGP) messages. For instance, whether a link is available for use as an MTRR repair path and for which topologies the link is so available may be advertised (e.g., in order to prevent unwarranted MTR cross-over).

In accordance with another aspect of the present invention, the protecting node may select an appropriate MTRR repair path with connectivity to a remerge node (i.e., where the repair path returns to a tail-end of the protected element), and that allows use thereof for such repair. In the event more than one alternative topology exists (e.g., a second, third, etc.), the protecting node may select the MTRR repair path in a topology offering the best repair path based on one or more path metrics, e.g., cost, delay, link load (utilization), link load per topology, etc.

In accordance with yet another aspect of the present invention, upon detection of a failure of the protected network element, the protecting node reroutes traffic originally utilizing the failed network element onto the corresponding repair path, e.g., the MTRR repair path. During the rerouting of traffic, the protecting node may need to manipulate the traffic for use by topologies other than the protected network element topology. For instance, the protecting node may encapsulate the traffic in the repair path topology such that the remerge point may remove the encapsulation to determine the original topology. Other techniques may be used to allow for the use by other topologies, such as applying a specific (e.g., learned) address of the remerge point that identifies to the remerge point into which topology the traffic should be remerged.

Advantageously, the novel technique protects against failure of a network element using MTRR in a computer network. By expanding repair path computation to MTR, the novel technique allows repair paths (e.g., for FRR) to be established where not otherwise available to a particular topology. In particular, the novel technique maintains the integrity of MTR (i.e., the distinct topologies) by specifically delineating allowable temporary usage of MTRR paths, thus preventing extended and unwarranted MTR topology cross-over. Further, the dynamic aspects of the novel technique alleviate the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
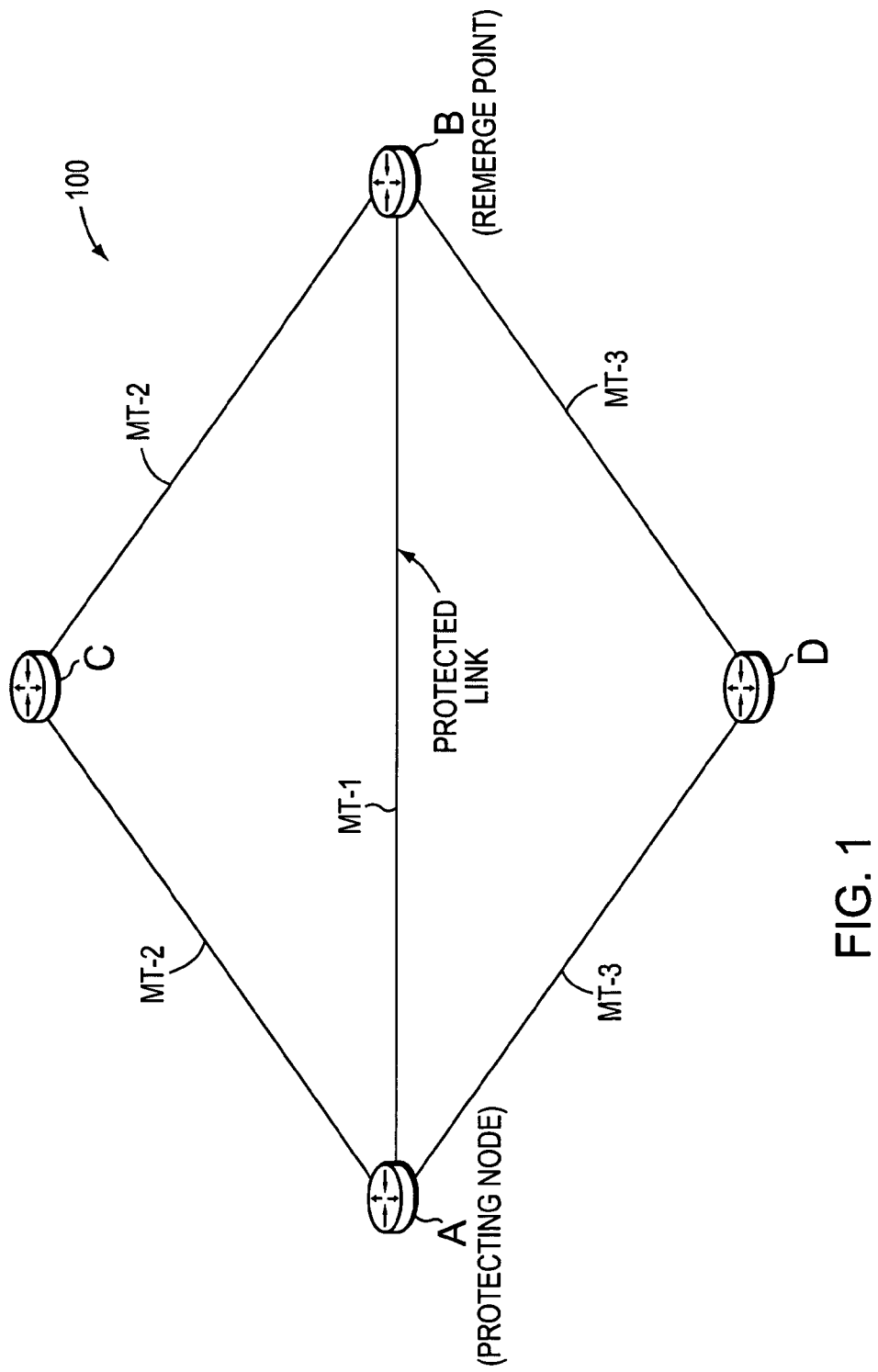
FIG. 1 is a schematic block diagram of an exemplary computer network that may be used in accordance with the present invention.

FIG. 1 is a schematic block diagram of an exemplary computer network 100 that may be advantageously used with the present invention. The network 100 comprises a plurality of interconnected network nodes/devices, such as Routers A-D. The routers may be interconnected by one or more links as shown, such as, e.g., over local area network (LAN) links, wireless LANs, etc., to form the network 100. As used herein, the links connecting the routers are referred to as the two network devices interconnected by the link. For example, B may be reached from A via Link A-B (or, notably, Link B-A). Illustratively, the nodes of the network 100 (Routers A-D) participate in Multi-Topology Routing (MTR), such that each link may belong to one or more specific topologies as described further herein. For instance, Link A-B may be part of a topology "MT-1," while Links A-C and C-B may be part of "MT-2" and Links A-D and D-B may be part of "MT-3." Network 100 may be configured as an autonomous system (domain), or as one or more areas or levels. Those skilled in the art will understand that any number of network elements, e.g., nodes, routers, links, etc., may be used in the computer network 100 and connected in a variety of ways and in a variety of different MTR configurations, and that the view shown herein is for simplicity.

Data packets may be exchanged among the nodes of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers within the network/domain 100 using predetermined "interior" gateway protocols (IGPs), such as conventional distance-vector protocols or, illustratively, link state protocols, through the use of IGP advertisements, e.g., link state advertisements or link state packets, described herein.

Figure 2:
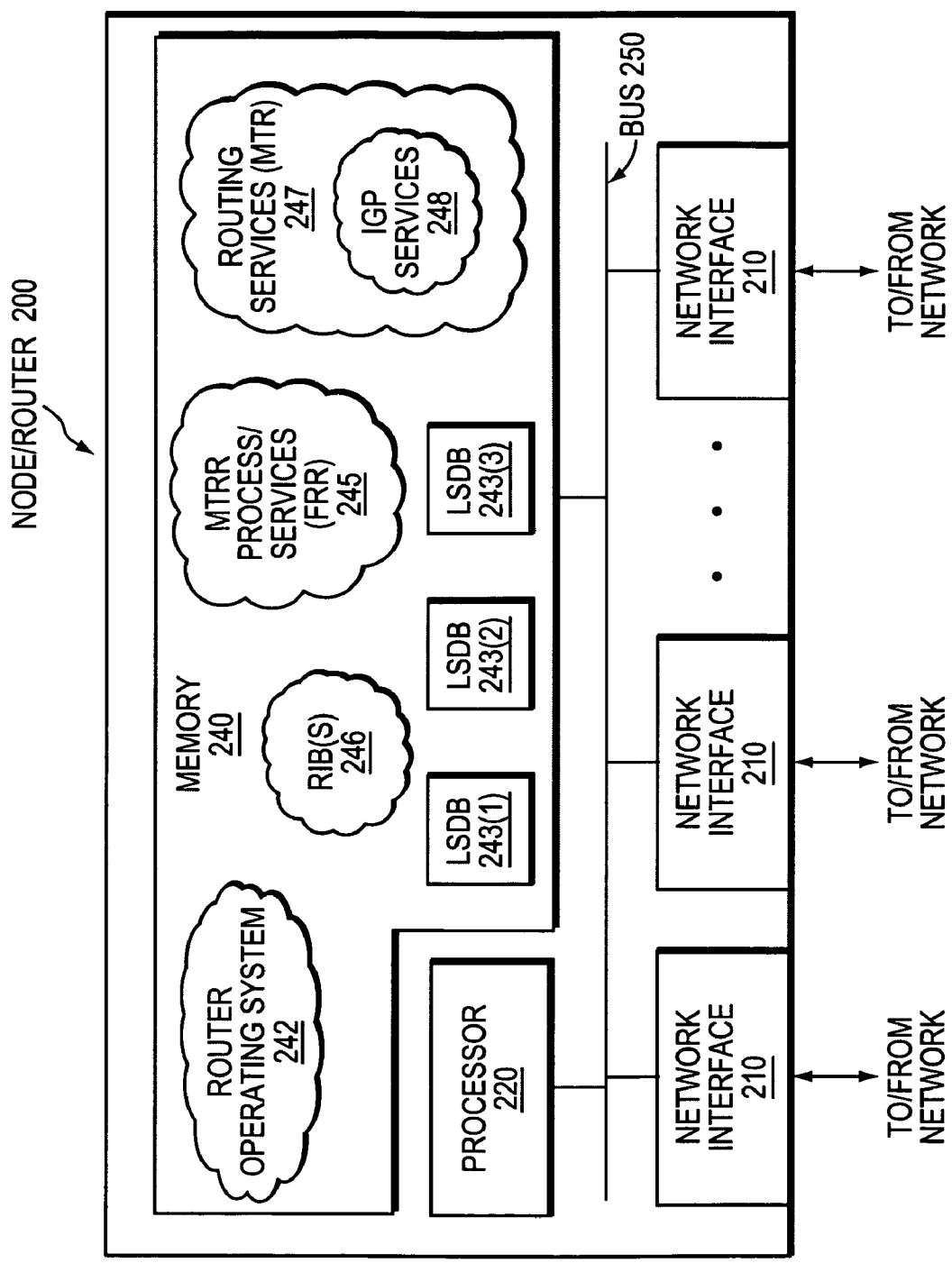
FIG. 2 is schematic block diagram of an exemplary network device/router that may be advantageously used with the present invention.

FIG. 2 is a schematic block diagram of an exemplary node 200, which is illustratively a router that may be advantageously used with the present invention. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data with interconnected network nodes using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as link state databases (LSDBs) 243, e.g., 243(1), 243 (2), and 243(3). A router operating system 242 (e.g., the Internetworking Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services may comprise routing services 247 (e.g., MTR services), IGP services 248, Router Information Bases (RIBs) 246, and Multi-Topology Repair Routing (MTRR) process/services 245 (e.g., MTR and Fast ReRoute, FRR), in accordance with the present invention. Notably, while the processes and/or services may be shown independently, various dependencies and interdependencies may be present between one or more processes/services accordingly. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP as IGP services 248 (e.g., OSPF and IS-IS), BGP, etc. These functions may be configured to manage a forwarding information database (not shown) containing, e.g., data used to make forwarding decisions. Illustratively, routing services 247 may compute shortest path trees (SPTs) using one or more path computation techniques, e.g., shortest path first, etc., as discussed above and will be understood further by those skilled in the art. Notably, routing services 247 may also perform functions related to MTR, as described herein as will be understood by those skilled in the art. Moreover, routing services 247 may also perform functions related to virtual routing protocols, such as maintaining Virtual Routing/Forwarding (VRF) instances (not shown) as will also be understood by those skilled in the art.

Changes in the network topology within the local domain (network 100) may be communicated among routers 200 within the network 100 using IGP services 248, such as the conventional OSPF and IS-IS link-state protocols. Suppose, for example, that a communication link fails or a cost value associated with a network node changes. Once the change in the network's state is detected by one of the routers, that router may flood an IGP advertisement/message communicating the change to the other routers in the network. In this manner, each of the routers eventually "converges" to an identical view of the network topology. Particularly, in accordance with the present invention, the link-state protocols may be extended to perform various MTR functions, for example, as described (for IS-IS) in the above-incorporated Internet Drafts by Przygienda et al., entitled *M-ISIS: Multi-Topology (MT) Routing in IS-IS*, and by Previdi et al., entitled *IS-IS Multi-instance Multi-topology*, and for OSPF in the above-incorporated Internet Draft by Psenak et al., entitled *Multi-Topology (MT) Routing in OSPF*.

Figure 3:
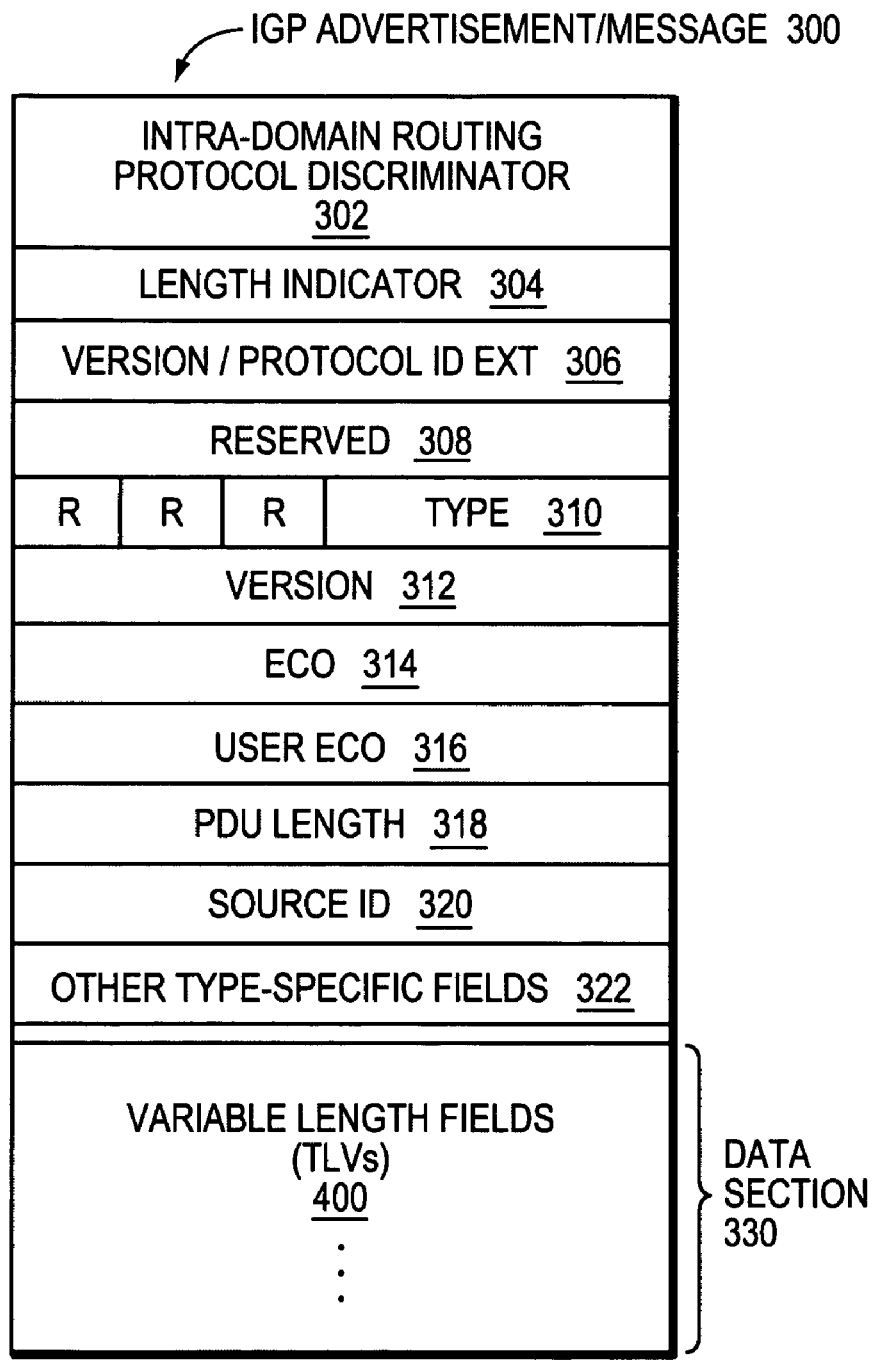
FIG. 3 is a schematic block diagram of an exemplary IGP Advertisement that may be transmitted by the routers.

FIG. 3 illustrates an exemplary IGP Advertisement/Message 300 that may be flooded by the routers 200. Illustratively, IGP advertisement 300 is shown as an IS-IS link state packet. Those skilled in the art will understand, however, that other IGP advertisements may be used in accordance with the present invention, such as, e.g., OSPF link state advertisements, etc. The advertisement 300 includes an intra-domain routing protocol discriminator field 302 that stores a value identifying the specific protocol of the message (e.g., IS-IS), and a length indicator field 304 that stores a value indicating the length of the standard header for the advertisement. Also, a version/protocol ID extension (ext) field 306 may be used to further store a value defining the particular version of the protocol. Reserved field 308 and "R" fields are reserved for future use with the protocol, as are the ECO and User ECO fields 314 and 316, all of which are illustratively ignored by the receiving router until directed for decoding in future versions of the protocol.

A type field 310 (and corresponding version field 312) stores a value indicating the type (and version) of advertisement 300 being transmitted, which may define the existence of other type-specific fields 322 within the advertisement. For example, the type of advertisement may be a "Hello" packet, a link state packet, etc., as will be understood by those skilled in the art. The PDU length field 318 stores a value indicating the length of the entire PDU (Protocol Data Unit, or advertisement 300), including the header, type-specific fields, and data fields. A source ID field 320 stores a value that identifies the router that generated and originally broadcast the advertisement 300.

The other type-specific fields 322 may include any number of fields as defined by the protocol, such as checksum fields, maximum area address fields, etc., as understood by those skilled in the art. For example, a sequence-number field (not shown) may store a sequence number indicating the relative version of the advertisement 300. Typically, the sequence number stored in the field is incremented, e.g., by one, for every new version of the advertisement. The advertisement 300 is therefore considered "stale" (invalid) if its sequence number is less than the sequence number stored in a previously-received version of the advertisement, i.e., generated by the same advertising node. Accordingly, the routers 200 may be configured to store and forward only the most recent version of an advertisement, e.g., the version having the largest sequence number. A remaining lifetime field (not shown) may also be used to store a value that may be used for determining whether the advertisement 300 is valid. The remaining lifetime value is typically initialized to a non-zero integer value, often in units of seconds. The remaining lifetime value may be decremented, e.g., by one every second, until the remaining lifetime value reaches zero, thereby indicating that the advertisement has become invalid. That is, every router 200 that stores or floods the advertisement 300 continuously ages the packet until the remaining lifetime value equals zero. Those skilled in the art will appreciate that other aging mechanisms alternatively may be used, such as incrementing the advertisement remaining lifetime value from an initial value, e.g., equal to zero, until the remaining lifetime value reaches a known upper limit.

The data section 330 includes one or more variable length fields 400, which each have a specific type (or code), length, and value (TLV) as described further herein. For example, to advertise network topology, one or more pairs of neighboring-node fields (not shown) and cost fields (not shown) may be used. The neighboring-node fields may store a value, such as an address, indicating a network node that is directly accessible from the intermediate node identified in the source ID field 320. The cost field may store a value that has been associated, e.g., by the advertising node, with the network node identified in the neighboring-node field. It is noted that in other embodiments, a single neighboring node may be associated with a plurality of cost values. Other routing information may also be included in the variable length fields 400 of the IGP advertisement 300, such as checksum values, padding fields, proprietary fields, etc. In addition, and particularly in accordance with the present invention, variable length fields 400 may also include an MTR topology identification to indicate to which topology the advertisement 300 (i.e., the values within the advertisement) pertain, as well as novel extended status fields, for use as described herein. Generally, the received IGP advertisements are stored in an LSDB 243 of the router 200. Notably, in the case of MTR topologies, each IGP advertisement 300 may be stored in an LSDB corresponding to an appropriate topology, as will be understood by those skilled in the art.

The TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 4:
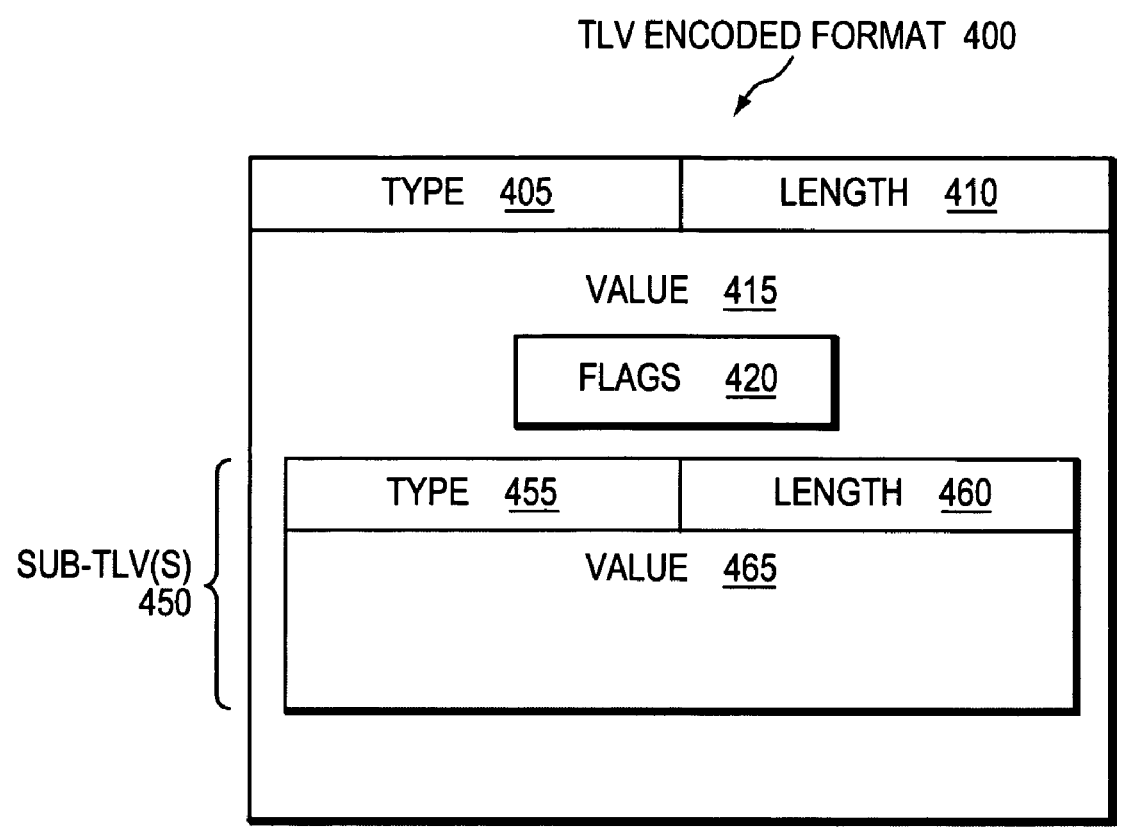
FIG. 4 is a schematic block diagram illustrating a variable length field (TLV) that may be advantageously used with the present invention.

FIG. 4 is a schematic block diagram illustrating the TLV encoded format 400 that may be advantageously used with the present invention. The TLV 400 may be used for a variable length field contained in an IGP advertisement 300, or other protocol messages in accordance with the present invention. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the present invention.

MTRR process/services 245 contains computer executable instructions executed by processor 220 to perform functions relating to conventional repair routing techniques, such as, e.g., FRR techniques (e.g., IP or tunneling/MPLS FRR). Additionally, MTRR process/services 245 may be configured to perform functions relating to the novel MTRR techniques (e.g., FRR for MTR) described herein.

The present invention is directed to a technique for protecting against failure of a network element using MTRR in a computer network. According to the novel technique, a protecting node (e.g., a router) maintains MTR databases for a first topology and at least a second topology. The protecting node determines whether any acceptable repair paths are available in the first topology for a protected network element (e.g., node, link, etc.) of the first topology. If not, the protecting node may establish a repair path (e.g., for FRR) in the second topology for the protected network element.

In accordance with one aspect of the present invention, the protecting node may be configured either to use at least one statically configured topology, or to dynamically discover at least one alternative topology suitable for repair paths. In static configuration, a system administrator explicitly states to the protecting node (e.g., router A) which MTR topology databases (e.g., LSDBs 243) are to be used for computing MTRR repair paths for a given protected network element and a given topology (e.g., for Link A-B of MT-1). For example, the static configuration may dictate that to compute a repair path for Link A-B, a second MTR topology (e.g., MT-2) is to be used. Or, more specifically, the static configuration may indicate the exact path to use (e.g., path A-C-B).

Alternatively, the protecting node (router A) may also be configured to dynamically discover/learn which other topologies may be used, and to determine the best available MTRR repair path for the protected network element (Link A-B). For instance, by inspecting its MTR databases, e.g., LSDB 243 (1), 243(2), and 243(3), the protecting node can determine the node at the other side of the protected link A-B (the "remerge point" or "remerge node"), i.e., where the potential repair path returns to original topology path (e.g., router B). Particularly, the protecting node (router A) belongs to topologies MT-1, MT-2, and MT-3, as shown, so each corresponding MTR database may be inspected to determine which topologies contain the remerge point (e.g., each of the three topologies).

Once the protecting node has determined which topologies contain the remerge point, the protecting node may then decide which topology to use for the protected network element's repair path, as described herein. Accordingly, to assist in this determination, nodes within the network 100 may dynamically advertise the status (e.g., per-topology) of the network links, the nodes themselves, etc., such as to create a dynamic MTRR repair strategy. Illustratively, such advertisements may be embodied as extensions to IGP messages 300, such as within a Link-Attribute TLV 400 in an IS-IS link state packet, or within an opaque link state advertisement 300 in OSPF, etc. For instance, whether a link is available for use as an MTRR repair path and for which topologies the link is so available may be advertised (e.g., in order to prevent unwarranted MTR cross-over). For example, router C may advertise to router A (the protecting node) that its link A-C may be used for repair paths of MT-1, but not for repairing MT-3. Also, certain conditions may be defined for the use of a link as an MTRR repair path, such as, e.g., time of day, type of traffic (voice, video, data, etc.), length of time allowed to be used, etc. Notably, other extended values, metrics, policies, etc. may be used in accordance with the present invention to define a dynamically created MTRR repair strategy, and those shown here are merely representative examples.

In accordance with another aspect of the present invention, the protecting node (e.g., router A) may select an appropriate MTRR repair path with connectivity to a remerge node (i.e., where the repair path returns to a tail-end of the protected element, e.g., router B), and that allows use thereof for such repair. For instance, as described above, the protecting node may determine that in order to protect the protected network element (e.g., Link A-B), the remerge point (router B) should be reachable by the alternate repair path topology (e.g., MT-2). Also as described above, it may be preferable that the links and/or nodes of the repair path topology (MT-2) have not advertised an inability or unwillingness to participate in MTRR for the protected network element's topology (e.g., MT-1). If these conditions are met, the MTRR repair path (e.g., path A-C-B) is an acceptable repair path, and may be established by the protecting node accordingly.

In the event more than one alternative topology exists (e.g., MT-3, etc.), the protecting node may select the MTRR repair path in a topology offering the best repair path based on one or more path metrics, e.g., cost, delay, etc. In addition, extended path metrics that may be used with the present invention may include, e.g., link load (utilization), link load per topology, other QoS metrics, etc. For instance, IGP messages 300 may be further extended to convey the link load (e.g., bandwidth utilization or availability) of the links of network 100, either as a general link characteristic or as a per-topology characteristic (e.g., for links belonging to multiple topologies, not shown), or even per class-of-service, as will be understood. Particularly, a higher QoS value (e.g., due to less-congested links) may be more desirable than a lower QoS value, provided other metrics are non-prohibitive. For example, assume that MTRR repair paths may be available on a second topology MT-2 and a third topology MT-3. In the event the repair paths are substantially equal cost (e.g., a difference not greater than a configurable threshold), the repair path having the better QoS value (e.g., less congestion) may be selected as the MTRR repair path to be established (e.g., path A-C-B of MT-2). By knowing the link utilization of potential repair paths, the protecting node may also determine whether there is sufficient bandwidth remaining on the links, such that redirection of protected traffic does not result in over-saturation of the repair paths links, possibly resulting in lowered QoS or lost packets. If there is not sufficient bandwidth, a different path should be selected, e.g., from a different topology.

Notably, the protecting node (router A) may be configured to only utilize an MTRR repair path of a second topology (e.g., MT-2) rather than the first topology (the protected network element's topology, e.g., MT-1) in the event the first topology does not have an acceptable repair path. However, in accordance with the present invention, the protecting node may alternatively be configured to select a repair path in a second topology regardless of an available repair path in the first topology. For example, the same technique for selecting a best repair path of multiple-available repair paths in different topologies described above may be used that includes the first topology, such that if a second topology offers a better repair path than the first topology, the second topology repair path may be used. Also, it may be acceptable to use a second topology even where a first topology offers a repair path in order to avoid QoS degradation of non-affected traffic of the first topology (i.e., traffic of the first topology not traversing the protected network element). For instance, by redirecting traffic over a repair path of the first topology, the QoS of the repair path (e.g., due to higher congestion) may be degraded. As such, it may be acceptable to degrade the QoS of the traffic to be redirected over the repair path (e.g., by utilizing a lower QoS topology) to prevent possible reduced QoS of the unaffected traffic.

Figure 5:
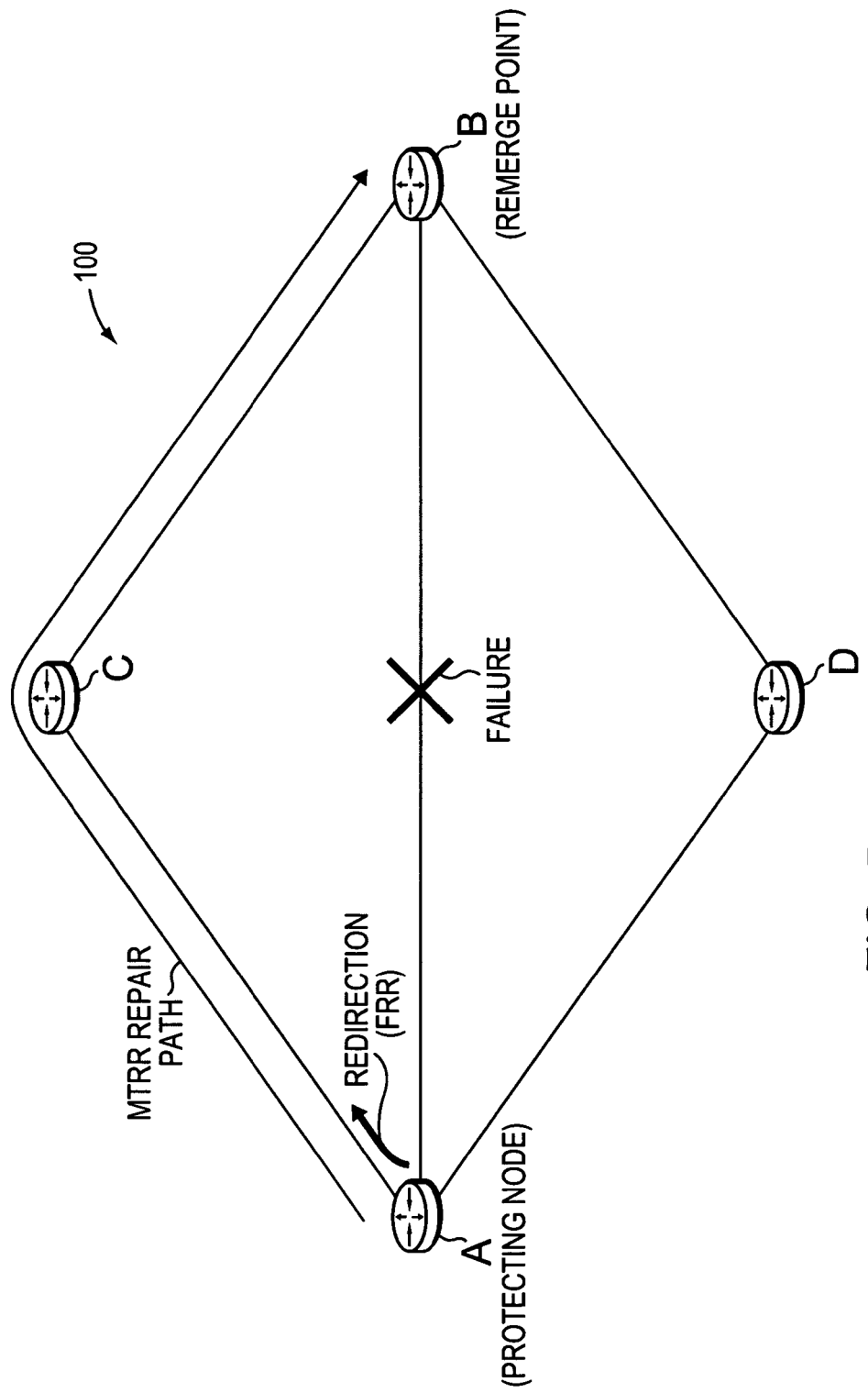
FIG. 5 is a schematic block diagram of the computer network of FIG. 1 with MTRR in accordance with the present invention.

In accordance with yet another aspect of the present invention, upon detection of a failure of the protected network element (e.g., Link A-B), the protecting node (e.g., router A) reroutes traffic originally utilizing the failed network element onto the corresponding repair path, e.g., the MTRR repair path. FIG. 5 is a schematic block diagram of the computer network 100 of FIG. 1 with MTRR in accordance with the present invention. Specifically, the protecting node (router A) may learn that the protected element (Link A-B) has failed (e.g., as indicated by the "X" overlaid thereon) through any known means of failure discovery, such as, e.g., IGP updates, connectivity detection protocols (such as Bidirectional Forwarding Detection, BFD messages), etc. In response to the failure, the protecting node (e.g., MTRR process 245) may redirect the traffic from the failed element onto the MTRR repair path (e.g., path A-C-B), such as in accordance with FRR. As mentioned above, the rerouting of traffic may correspond to IP traffic (IP FRR) or tunneled traffic (tunneling or MPLS TE FRR), as will be understood by those skilled in the art.

During the rerouting of traffic, the protecting node (router A) may need to manipulate the traffic for use by topologies other than the protected network element topology (e.g., MT-1). For instance, the protecting node may encapsulate the traffic in the repair path topology (e.g., MT-2) such that the remerge point (e.g., router B) may remove the encapsulation to determine the original topology. In particular, because some implementations of MTR utilize separate RIBs 246 (i.e., and separate LSDBs 243) for each topology, it is important to maintain the address separation to prevent address collision (e.g., caused by having a same address used for different network devices in the multiple topologies), as will be understood by those skilled in the art. Also, it may often be the case that network nodes not on a particular topology do not know/understand addresses from other topologies. For instance, an intermediate node (e.g., router C) may not know the remerge point's (or a downstream node's) address in the original topology (MT-1), but instead knows the corresponding address in the repair path topology (MT-2).

Figure 6:
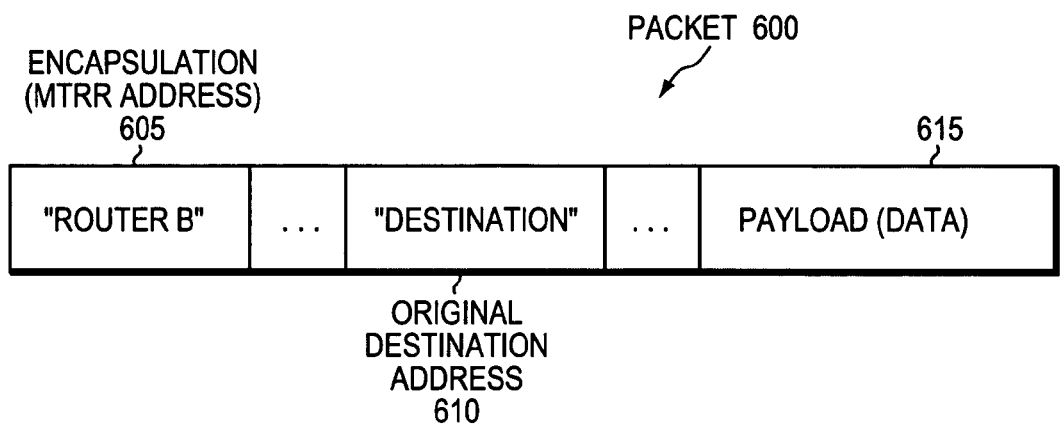
FIG. 6 is a schematic block diagram of portions of an exemplary encapsulated packet that may be advantageously used with the present invention.

FIG. 6 is a schematic block diagram of portions of an exemplary encapsulated packet 600 that may be advantageously used with the present invention. Illustratively, the packet is embodied as a TCP/IP packet, but those skilled in the art will understand that other suitable network transmission formats (e.g., ATM frames, etc.) may be used in accordance with the present invention. The encapsulated packet 600 may include (e.g., within one or more headers) an MTRR address encapsulation 605 and an original address (destination) field 610. Original destination address 610 is the network address for the destination of the packet, which may be the remerge point (router B) or a network device further downstream from the remerge point (not shown). The data content of the payload field 615 may be any type of data, as will be understood by those skilled in the art, such as, e.g., voice, video, data, etc. Notably, other fields (not shown) have been omitted from the packet 600 for clarity, and the packet format as shown is merely representative.

Encapsulation field 605 of packet 600 may be populated by the protecting node to identify the remerge point (router B) as it is known within the repair path topology (e.g., MT-2). For instance, the remerge point may have a separate address for the original topology (e.g., MT-1) and the repair path topology. As such, when redirecting traffic over the repair path to the remerge point, an address (or label) that is known within the repair path topology should be used. Otherwise, an intermediate node along the repair path (e.g., router C) may receive the packet with an unknown address, and potentially drop the packet 600. With the encapsulation, however, the intermediate node(s) may forward the packet to the remerge point, which may then de-encapsulate the message (e.g., removing the encapsulated address 605 or "popping" a "pushed" label 605), and determine the appropriate action, namely within the original topology (MT-1). (Notably, the packet may be sent along the repair path with a different QoS than the original path, as will be understood by those skilled in the art.)

Other techniques may be used to allow for the use of packet 600 by other topologies, such as applying a specific address of the remerge point (e.g., router B) that identifies to the remerge point into which topology the traffic should be remerged. For instance, the remerge point may advertise (e.g., through IGP messages 300) a set of addresses/labels that result in MTR topology translation at the remerge point. The protecting node (e.g., router A) may learn these addresses/labels, and may apply them to the packet 600 accordingly. For example, certain addresses may be used (e.g., as either an encapsulated address 605 or as a replaced original address 610) that inform the remerge point (router B) that a packet 600 received from a repair path topology (e.g., MT-2) is to be remerged onto an original topology (e.g., MT-1).

Notably, as with conventional repair techniques (e.g., FRR), the traffic may be redirected/rerouted until reconvergence of the network 100. Particularly, once the original (first) topology (e.g., MT-1) reconverges, the repair path is no longer necessary, and the new path within the original topology may be used. In accordance with the present invention, and in furtherance of the integrity of MTR, one or more policies may be defined that limit the amount of time allowed for cross-over repair path utilization (i.e., using a topology for repair that is different than the protected topology). For instance, a length of time may be configured (e.g., by a system administrator) that may be applied during redirection of traffic onto an MTRR repair path. Upon expiration of this length of time (e.g., a timer), the protecting node (e.g., router A) may be configured to cease redirection of traffic. Alternatively, an intermediate node (e.g., router C) may be configured to police (or otherwise manage) the redirected traffic on the MTRR repair path. The purpose of this optional aspect is to prevent excessive cross-utilization of MTR topologies, thus allowing MTRR on different topologies only as long as deemed reasonable and necessary.

Figure 7A:
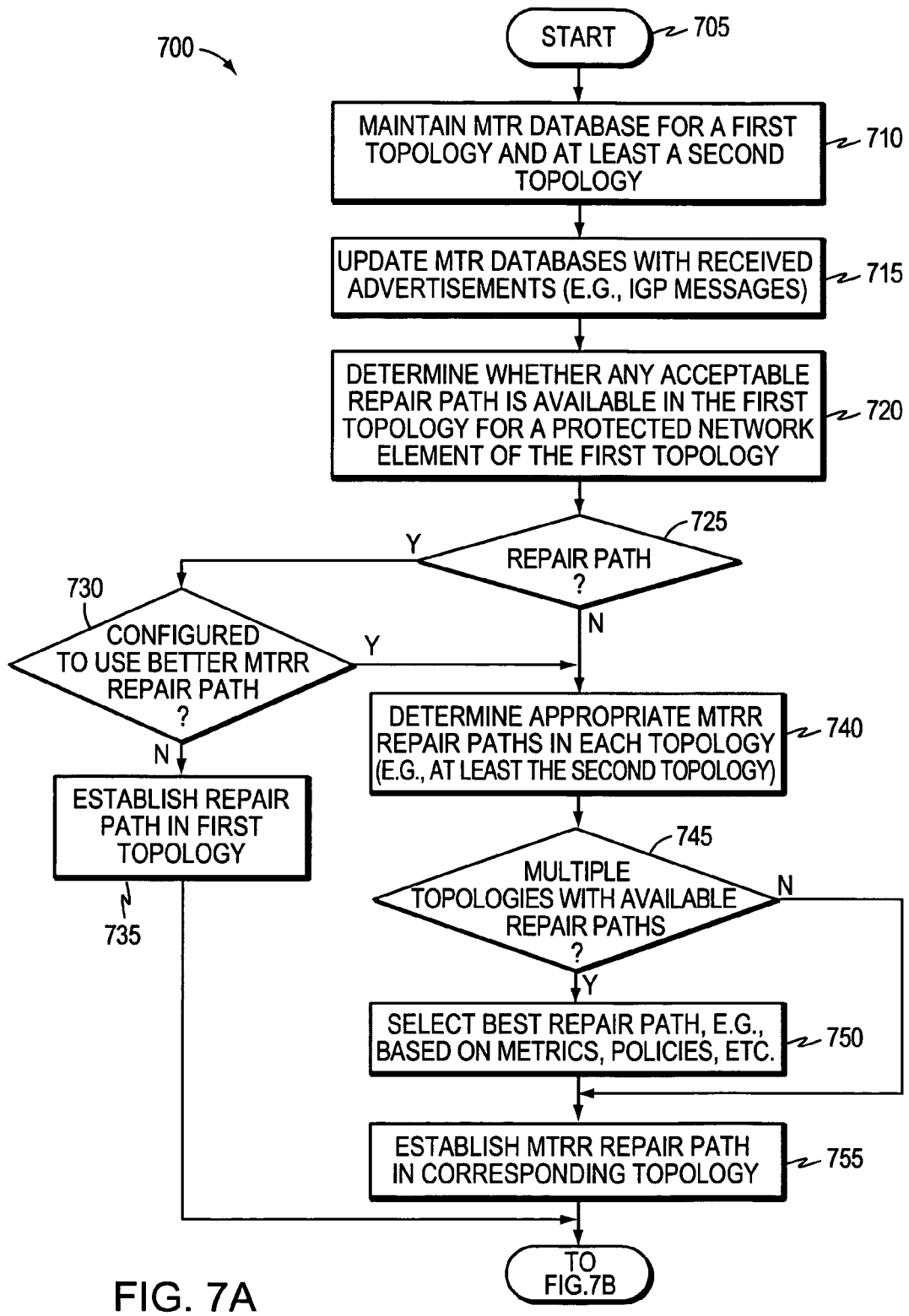
FIGS. 7A and 7B are flowcharts illustrating a procedure for protecting against failure of a network element using MTRR in accordance with the present invention.
Figure 7B:
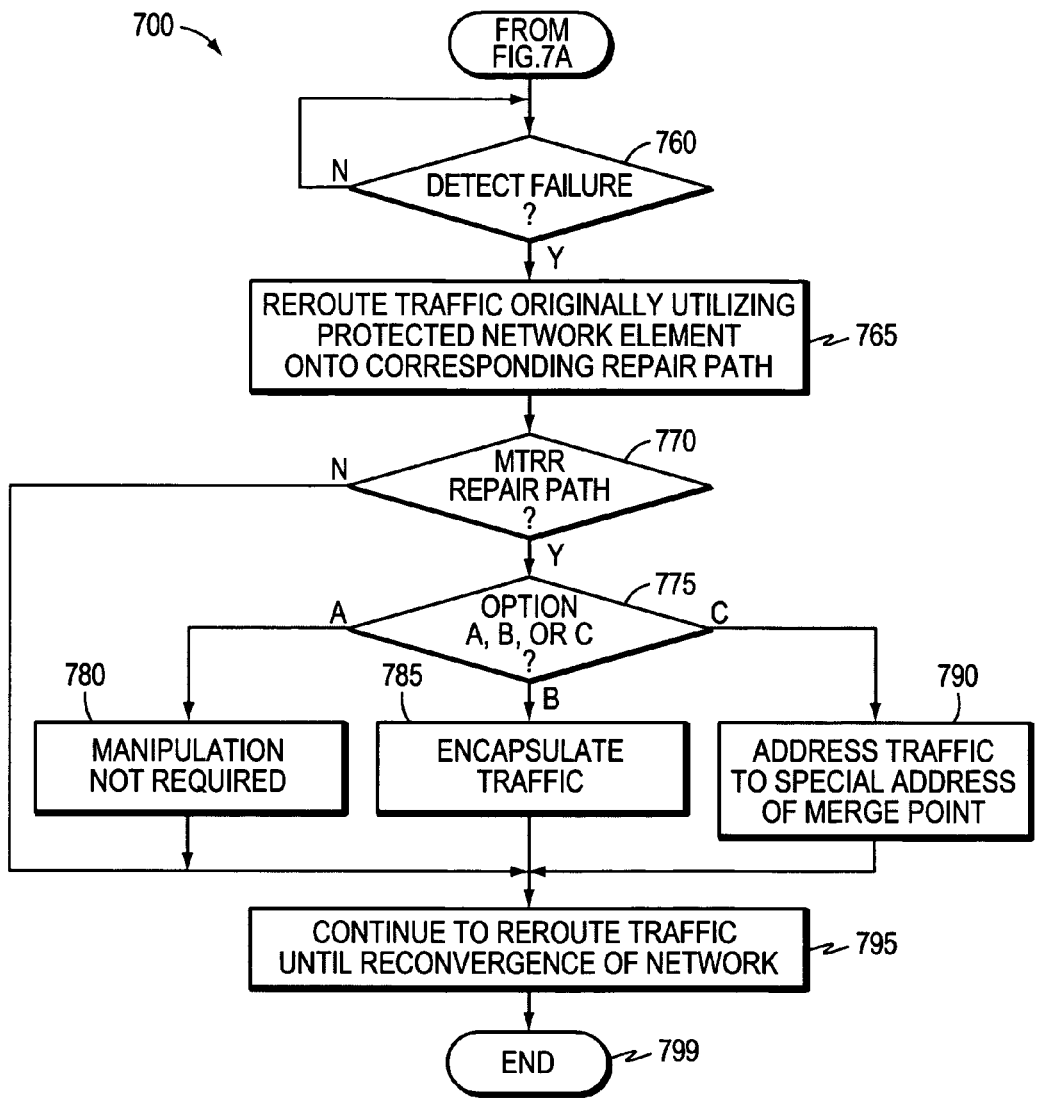

FIGS. 7A and 7B are flowcharts illustrating a procedure for protecting against failure of a network element using MTRR in accordance with the present invention. The procedure 700 starts at step 705, and continues to step 710, where a protecting node (e.g., router A) maintains MTR databases (e.g., LSDBs 243) for a first topology (e.g., MT-1) and at least a second topology (e.g., MT-2). At step 715, the protecting node updates the MTR databases with received advertisements, such as received IGP messages 300 as described above. With the information stored in the MTR databases, the protecting node may determine whether any acceptable repair path is available in the first topology for a protected network element (e.g., link A-B) of the first topology in step 720. If there is a first topology repair path in step 725, and the protecting node is not configured to use a better MTRR repair path (as described above) in step 730, the protecting node establishes the repair path in the first topology in step 735, and the procedure 700 continues to FIG. 7B. If, on the other hand, there is no repair path in the first topology at step 725, or if the protecting node is configured to use a better MTRR repair path in step 730, the protecting node determines appropriate MTRR repair paths in each topology, for example, at least the second topology (MT-2), in step 740. Notably, in the event that multiple MTRR repair paths are available in step 745 (e.g., path A-C-B in MT-2 and path A-D-B in MT-3), the protecting node selects the best MTRR repair path in step 750, e.g., based on various metrics, policies, etc., as described above. In step 755, the protecting node establishes the selected (or only) MTRR repair path in the corresponding topology, and the procedure 700 continues to FIG. 7B.

In FIG. 7B, the procedure 700 continues to step 760, where the protecting node awaits a detected failure of the protected network element. In response, the protecting node reroutes traffic originally utilizing the protected (now failed) network element onto the corresponding repair path in step 765. If the repair path is not an MTRR repair path in step 770 (i.e., it is a repair path in the first topology), then the protecting node continues to reroute the traffic until reconvergence of the network 100 (e.g., especially of the first topology) in step 795, and the procedure 700 ends in step 799. However, if in step 770 the repair path is an MTRR repair path, the protecting node may be configured to reroute the traffic in a different manner in step 775, e.g., options "A," "B," or "C." In option A, step 780, manipulation of the traffic is not required, and the protecting node simply reroutes the traffic as is. In option B, step 785, however, the intermediate nodes of the MTRR repair path (e.g., router C of MT-2) may not understand the first topology's (MT-1's) address, so an encapsulation of the traffic may occur as described above. In option C, step 790, the intermediate node may still not understand the first topology's address. Accordingly, a special address known to the corresponding topology (e.g., MT-2) of the remerge point (e.g., router B) may be used, such that the remerge point will understand that the received traffic is to be remerged onto the first topology, also as described above. Through each of the available options of step 775, the protecting node continues to reroute the traffic until reconvergence of the network 100 in step 795, and the procedure 700 ends in step 799.

Advantageously, the novel technique protects against failure of a network element using MTRR in a computer network. By expanding repair path computation to MTR, the novel technique allows repair paths (e.g., for FRR) to be established where not otherwise available to a particular topology. In particular, the novel technique maintains the integrity of MTR (i.e., the distinct topologies) by specifically delineating allowable temporary usage of MTRR paths, thus preventing extended and unwarranted MTR topology cross-over. Further, the dynamic aspects of the novel technique alleviate the need for cumbersome manual configuration.

While there has been shown and described an illustrative embodiment that protects against failure of a network element using MTRR in a computer network, it is to be understood that various other adaptations and modifications may be made within the spirit and scope of the present invention. For example, the invention has been shown and described herein for use with IP FRR. However, the invention in its broader sense is not so limited, and may, in fact, be used with any repair scheme, such as Multi-Protocol Label Switching (MPLS) FRR, etc., as will be understood by those skilled in the art. Also, while the above description describes utilizing IGP messages 300 to transmit the MTRR information, those skilled in the art will understand that other mechanisms may be utilized in accordance with the present invention, such as, e.g., specific MTRR protocols designed to transmit the information. Further, while the above description is directed to MTR, the present invention may also be utilized with other multi-topology-like technologies, such as, e.g., VPNs and corresponding VRF instances, as will also be understood by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A node for use with protecting against failure of a network element in a computer network, the node comprising:
   one or more network interfaces;
   a processor coupled to the one or more network interfaces and configured to execute software processes; and
   a memory configured to store at least one Multi-Topology Routing (MTR) database for a first MTR topology and at least one different MTR database for at least a second MTR topology, wherein each MTR topology is an independent network topology among a plurality of network elements of the computer network supported by a single physical network topology of the computer network, where each independent network topology utilizes a different shortest path tree (SPT) within the computer network, the memory further configured to store an Multi-Topology Repair Routing (MTRR) process executable by the processor, the MTRR process configured to: i) determine whether any acceptable repair paths are available within the first MTR topology to reroute traffic around a protected network element of the first MTR topology, ii) if so, establish a repair path within the first MTR topology to reroute traffic around the protected network element, the repair path within the first MTR topology utilizing a subset of the network elements of the first MTR topology, and iii) if not, establish a repair path within the second MTR topology to reroute traffic around the protected network element, the repair path within the second MTR topology utilizing a subset of the network elements of the second MTR topology.

2. The node as in claim 1, wherein the protected network element is selected from a group consisting of: a node, a plurality of nodes, a link, a plurality of links, and a shared risk link group (SRLG).

3. The node as in claim 1, wherein the second MTR topology is statically configured as a suitable topology for repair paths.

4. The node as in claim 1, wherein the MTRR process is further configured to:
   dynamically discover the second MTR topology as a suitable independent network topology for repair paths and an alternative to the first MTR topology.

5. The node as in claim 1, wherein the MTRR process is further configured to:
   receive advertisements containing a status of at least one link or node of the network, the status corresponding to the usage of links and nodes in repair paths within the first MTR topology and the second MTR topology.

6. The node as in claim 5, wherein the advertisements are embodied as Interior Gateway Protocol (IGP) messages.

7. The node as in claim 5, wherein the status is selected from a group comprising: whether a link is available for use in a repair path, for which topologies a link is available for use in a repair path, for which topologies a link is not available for use in a repair path, under which conditions a link is available for use in a repair path, under which conditions a link is not available for use in a repair path, a length of time a link is to be used in a repair path, whether a node is available for use in a repair path, for which topologies a node is available for use in a repair path, for which topologies a node is not available for use in a repair path, under which conditions a node is available for use in a repair path, under which conditions a node is not available for use in a repair path, and a length of time a node is to be used in a repair path.

8. The node as in claim 1, wherein the MTRR process is further configured to:
   determine that no acceptable repair path is available in the first MTR topology based on a policy to use the second MTR topology.

9. The node as in claim 1, wherein the MTRR process is further configured to:
   determine that no acceptable repair path is available in the first MTR topology based on a preferred repair path in the second MTR topology.

10. The node as in claim 1, wherein the MTRR process is further configured to:
    determine bandwidth availability of a possible repair path; and
    not select the possible repair path in the event the bandwidth availability is below a configurable threshold.

11. The node as in claim 1, wherein the MTRR process is further configured to:
    determine that acceptable repair paths are available in multiple MTR topologies; and
    select a repair path in a MTR topology having a best repair path based on one or more metrics.

12. The node as in claim 11, wherein the metrics are selected from a group consisting of: cost, delay, link load, bandwidth availability, link load per topology, and link load per class-of-service.

13. The node as in claim 1, wherein the MTRR process is further configured to:
   detect a failure of the protected network element; and in response
   reroute traffic originally utilizing the protected network element onto the corresponding repair path.

14. The node as in claim 13, wherein the MTRR process is further configured to:
   manipulate the rerouted traffic for use by intermediate nodes of the second MTR topology.

15. The node as in claim 14, wherein the MTRR process is further configured to:
   encapsulate the traffic with an encapsulation usable by intermediate nodes of the second MTR topology.

16. The node as in claim 15, wherein the encapsulation is configured to be removed by a remerge point of the repair path to reveal the first MTR topology, the remerge point routing the traffic based on the first MTR topology revealed by removing the encapsulation.

17. The node as in claim 14, wherein the MTRR process is further configured to:
   apply an address of a remerge point that identifies the first MTR topology to the remerge point and that is usable by intermediate nodes of the second MTR topology.

18. The node as in claim 13, wherein the MTRR process is further configured to:
   reroute traffic in accordance with Fast ReRoute (FRR).

19. A method for protecting against failure of a network element in a computer network, the method comprising:
   maintaining, by a router, at least one Multi-Topology Routing (MTR) database for a first MTR topology and at least one different MTR database for at least a second MTR topology, wherein each MTR topology is an independent network topology among a plurality of network elements of the computer network supported by a single physical network topology of the computer network, where each independent network topology utilizes a different shortest path tree (SPT) within the computer network;
   determining whether any acceptable repair paths are available within the first MTR topology to reroute traffic around a protected network element of the first MTR topology;
   if so, establishing a repair path within the first MTR topology to reroute traffic around the protected network element, the repair path within the first MTR topology utilizing a subset of the network elements of the first MTR topology; and
   if not, establishing a repair path within the second MTR topology to reroute traffic around the protected network element, the repair path within the second MTR topology utilizing a subset of the network elements of the second MTR topology.

20. A non-transitory computer readable medium containing executable program instructions for protecting against failure of a network element in a computer network, the executable program instructions comprising program instructions configured to:
   maintain at least one Multi-Topology Routing (MTR) database for a first MTR topology and at least one different MTR database for at least a second MTR topology, wherein each MTR topology is an independent network topology among a plurality of network elements of the computer network supported by a single physical network topology of the computer network, where each independent network topology utilizes a different shortest path tree (SPT) within the computer network;
   determine whether any acceptable repair paths are available within the first MTR topology for a protected network element of the first MTR topology;
   if so, establish a repair path within the first MTR topology to reroute traffic around the protected network element, the repair path within the first MTR topology utilizing a subset of the network elements of the first MTR topology; and
   if not, establish a repair path within the second MTR topology to reroute traffic around the protected network element, the repair path within the second MTR topology utilizing a subset of the network elements of the second MTR topology.

21. The method as in claim 19, further comprising:
   dynamically discovering, by the router, that the second MTR topology is a suitable independent network topology for repair paths and is an alternative to the first MTR topology.

22. The method as in claim 19, further comprising:
   determining that acceptable repair paths are available in multiple MTR topologies; and
   selecting a repair path in a MTR topology having a best repair path based on one or more metrics.

23. The method as in claim 19, further comprising:
   encapsulating traffic rerouted onto the repair path within the second MTR topology.

24. The method as in claim 23, further comprising:
   removing the encapsulation at a remerge point of the repair path; and
   routing, by the remerge point, the traffic back into the first MTR topology.

25. A method comprising:
   maintaining routing information for a first Multi-Topology Routing (MTR) topology supported by an underlying physical network topology and for a plurality of other MTR topologies supported by the underlying physical network topology, wherein each MTR topology utilizes a different shortest path tree (SPT) among a plurality of network elements of the underlying physical network topology;
   determining, by a protecting network element, whether there is a repair path available in the first MTR topology to reroute traffic around a protected network element;
   if there is a repair path available in the first MTR topology, establishing a repair path within the first MTR topology for the protected network element, the repair path within the first MTR topology utilizing a subset of the network elements of the first MTR topology; and
   if there is not a repair path available in the first MTR topology,
      determining a repair path within each of the plurality of other MTR topologies,
      selecting a repair path within a particular one of the plurality of other MTR topologies based on one or more metrics, and
      establishing the repair path for the protected network element within the particular one of the plurality of other MTR topologies.

26. The method of claim 25, further comprising: detecting a failure of the protected network element; and rerouting traffic originally utilizing the protected network element onto the repair path within the particular one of the plurality of other MTR topologies.

27. The method of claim 26, wherein the rerouting further comprises:
   encapsulate the traffic with an encapsulation that indicates a remerge point of the repair path, the remerge point identified by an address used within the particular one of the plurality of other MTR topologies.

28. The method of claim 25, wherein the routing information comprises a link state database (LSDB), such that a LSDB is maintained for the first MTR topology and for each of the plurality of other MTR topologies, and the determining whether there is a repair path available in the first MTR topology utilizes the LSDB of the first MTR topology and the determining a repair path within each of the plurality of other MTR topologies utilizes the LSDBs of the plurality of other MTR topologies.

* * * * *